(12) United States Patent
Son et al.

(10) Patent No.: US 6,636,492 B1
(45) Date of Patent: Oct. 21, 2003

(54) APPARATUS FOR INTERFACING BETWEEN MOBILE SWITCHING CENTER AND INTERWORKING FUNCTION UNIT

(75) Inventors: Myeong Uk Son, Seoul (KR); Sang Ho Park, Kyoungki-do (KR)

(73) Assignee: Hundai Electronic Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/520,555

(22) Filed: Mar. 8, 2000

(30) Foreign Application Priority Data

Mar. 25, 1999 (KR) .......................................... 1999-10323

(51) Int. Cl.⁷ ................................................. H04Q 7/00
(52) U.S. Cl. ....................................... 370/329; 455/561
(58) Field of Search ................................. 370/229, 310, 370/328, 329, 335, 340.1, 342, 351–4, 357–9, 395.63, 431, 441, 463, 535; 455/422, 445, 450

(56) References Cited

U.S. PATENT DOCUMENTS

| | | | |
|---|---|---|---|
| 5,533,019 A | | 7/1996 | Jayaplan |
| 5,850,391 A | | 12/1998 | Essigmann |
| 5,917,816 A | | 6/1999 | Jacobson |
| 5,936,948 A | * | 8/1999 | Sicher .......................... 370/314 |
| 5,949,773 A | * | 9/1999 | Bhalla et al. ................. 370/331 |
| 6,173,177 B1 | * | 1/2001 | Lu et al. ...................... 455/445 |
| 6,205,157 B1 | * | 3/2001 | Galyas et al. ................ 370/503 |
| 6,229,793 B1 | * | 5/2001 | Jawanda ...................... 370/328 |
| 6,259,684 B1 | * | 7/2001 | Fong et al. ................... 370/328 |
| 6,330,451 B1 | * | 12/2001 | Sen et al. ................... 455/452.2 |
| 6,353,605 B1 | * | 3/2002 | Rautanen et al. ............ 370/337 |

* cited by examiner

*Primary Examiner*—David Vincent
(74) *Attorney, Agent, or Firm*—R. Neil Sudol; Henry D. Coleman; William J. Sapone

(57) ABSTRACT

An apparatus for interfacing between a mobile switching center (MSC) and an inter working function unit (IWF), comprising an inter-system link protocol (ISLP) processing part for processing a plurality of subhighway (SHW) data inputted respectively through SHWs in the unit of subscribers according to an ISLP. The ISLP processing part further separates data transferred over a given channel of an E1 trunk from the IWF according to the SHWs and their time slots and transfers the separated data respectively to the subscribers. A dual port random access memory (RAM) stores the subscriber-unit data processed by the ISLP processing part in the unit of channels or the data transferred over the given E1 trunk channel from the IWF in the unit of the subscribers. A frame relay protocol processing part extracts only a plurality of actual subscriber data from the channel-unit data stored in the dual port RAM, processes the extracted actual subscriber data according to a frame relay protocol, assigns the processed actual subscriber data to a specific channel of the E1 trunk and transfers them to the IWF. The frame relay protocol processing part further extracts respective subscriber data from the data transferred over the given E1 trunk channel from the IWF and stores the extracted subscriber data in the dual port RAM in the unit of the subscribers.

11 Claims, 4 Drawing Sheets

APPARATUS FOR INTERFACING BETWEEN MOBILE SWITCHING CENTER AND INTERWORKING FUNCTION UNIT

BACKGROUND OF THE INVENTION

1. Field of the Invention

The present invention relates in general to an apparatus for interfacing between a mobile switching center and an inter working function unit (IWF) according to a frame relay protocol, and more particularly to an apparatus for interfacing between a mobile switching center and an IWF in a code division multiple access (CDMA) mobile telecommunications system, in which the mobile switching center is adapted to transfer a particular number of low-rate (for example, 8 Kbps) subscriber data to the IWF while mapping them into one trunk channel, thereby enhancing the utilization of the trunk channel.

2. Description of the Prior Art

Generally, in a radio data service network using a CDMA mobile telecommunications system, a new network known as an IWF network is further provided to smoothly perform a radio data service.

FIG. 1 shows the construction of a radio data service network of a general mobile telecommunications system in which an IWF network is newly provided as mentioned above. In this drawing, the reference numeral 1 denotes a personal computer (PC) for interfacing data with a mobile station (MS) 2, which, in turn, communicates data with a base transceiver station (BTS) 3 by radio. A base station controller (BSC) 4 is adapted to control the data communication of the BTS 3. A mobile switching center (MSC) 5 is adapted to switch data between specific mobile stations through the BSC 4. A CDMA network 6 is connected to the MSC 5 to communicate data with the MSC 5. A public switched telephone network (PSTN) 7 is connected to the MSC 5 to perform an analog voice telephone service. An IWF 10 is adapted to interface data with the MSC 5 through an IS-658 L interface. A packet switched & public data network (PSPDN) 8 and Internet 9 are connected to the IWF 10 to provide data and voice services.

In FIG. 1, the reference character Rm, not described, denotes an interface between the PC 1 and MS 2, Um denotes an interface between the MS 2 and BTS 3, A denotes an interface between the BSC 4 and MSC 5, Ai denotes an interface between the MSC 5 and PSTN 7, E denotes an interface between the MSC 5 and CDMA network 6 and Pi denotes an interface between the IWF 10 and PSPDN 8. Further, the reference numeral 11, not described, denotes a home location register (HLR).

In the general mobile telecommunications system with the above-mentioned construction, the PC 1 and MS 2 are interconnected via an RS-232C to interface data therebetween. The MS 2, in turn, communicates data and voice with the BTS 3 ia a radio interface (a transmission rate on the radio side: 8 Kbps) based on the IS-95 standard.

The BTS 3 communicates information of the BS 2 with the SC 4 via a wired interface and further transmits and receives voice and data to/from the BS 2 by radio via the IS-95 standard-based radio interface. That is, the BTS 3 handles a call control processing function, radio signal transmission/reception functions, a radio resource management function, a time information management function, error detection/statistical information collection/report functions, a packet routing function and a power control function.

The BSC 4 is located between the BTS 3 and MSC 5 to communicate data in the form of voice packets with the BTS 3 by wire and to perform a man-machine interface function for an operator interface and a global positioning system (GPS) reception function with the MSC 5. Namely, the BSC 4 handles an inter-mobile station call connection function, a handoff function when a mobile station moves from one sector to another sector in a base transceiver station or from a service area of a current base transceiver station to a service area of a different base transceiver station, a function of communicating voice and data information in the form of packets with a base transceiver station over a wired channel, a function of interfacing voice and signals with a mobile switching center, voice compression/restoration (transcoding) functions, a man-machine interface function for an operator interface, base transceiver station operation and construction management functions, and base station controller maintenance and fault management functions.

The MSC 5 performs interfacing operations with other MSCs, fixed subscribers and mobile telecommunication elements. Further, the MSC 5 performs inter working interfacing operations with other networks such as an integrated service digital network (ISDN) and public switched data network (PSDN). In the case where the MSC 5 includes an additional cellular gateway switching system function, it is implemented with a multiprocessor structure for distributing functions and loads. Such a multiprocessor structure is a two-step hierarchical, distributed control structure consisting of a master processor and slave processors.

On the other hand, in the general radio data service network construction as mentioned above, recently, the IWF 10 is newly provided to smoothly perform a radio data service.

As a result, there is a need for an interface to smoothly communicate voice and data between the MSC 5 and IWF 10.

A conventional interface between the MSC 5 and IWF 10 is based on an interface protocol defined in the IS-658 standard.

Further, the MSC 5 and IWF 10 transmit and receive data therebetween in a circuit switching manner or a packet switching manner. Information can be basically transferred at a rate of 64 Kbps in such a data transfer system. However, such a transfer rate may be an obstacle to the transfer of information in the packet switching manner due to a complexity in protocol.

A large amount of time is required for the transfer of a large amount of information in the case where such an obstacle is present or an information transfer rate per given time is low. A protocol newly proposed to overcome this problem is a frame relay protocol, which is able to interface high-rate data at the maximum rate of 2 Mbps.

However, in the case where the above data transfer system is directly applied to transfer data to a trunk, a channel utilization of the trunk will be degraded because a data transfer rate based on an inter-system link protocol (ISLP) between a base station controller and a mobile switching center is 8 Kbps.

In other words, in the case where the existing data transfer system is directly applied although the channel transfer rate of the trunk is 64 Kbps, it cannot help transferring data at a rate of 8 Kbps, resulting in the channel utilization of the trunk being reduced to $\frac{1}{8}$.

SUMMARY OF THE INVENTION

Therefore, the present invention has been made in view of the above problems, and it is an object of the present invention to provide an apparatus for interfacing between a mobile switching center (MSC) and an inter working function unit (IWF) in a code division multiple access (CDMA) mobile telecommunications system, in which the MSC is adapted to transfer a large number of subscriber data to the IWF while mapping them into one trunk channel, thereby enhancing the utilization of the trunk channel.

In accordance with the present invention, the above and other objects can be accomplished by a provision of an apparatus for interfacing between a mobile switching center and an inter working function unit, comprising inter-system link protocol processing means for a) processing a plurality of subhighway data inputted respectively through subhighways in the unit of subscribers according to an inter-system link protocol; and b) separating data transferred over a given channel of an E1 trunk from the inter working function unit according to the subhighways and their time slots and transferring the separated data respectively to the subscribers; storage means for storing the subscriber-unit data processed by the inter-system link protocol processing means in the unit of channels or the data transferred over the given E1 trunk channel from the inter working function unit in the unit of the subscribers; and frame relay protocol processing means for a) extracting only a plurality of actual subscriber data from the channel-unit data stored in the storage means, processing the extracted actual subscriber data according to a frame relay protocol, assigning the processed actual subscriber data to a specific channel of the E1 trunk and transferring them to the inter working function unit; and b) extracting respective subscriber data from the data transferred over the given E1 trunk channel from the inter working function unit and storing the extracted subscriber data in the storage means in the unit of the subscribers.

Preferably, the inter-system link protocol processing means includes a high-level data link controller for formatting the plurality of subhighway data into a high-level data link control format, separating the data transferred over the given E1 trunk channel from the inter working function unit according to the subhighways and their time slots and transferring the separated data respectively to the subscribers via the subhighways; and an inter-system link protocol processor for processing the subhighway data formatted by the high-level data link controller according to the inter-system link protocol, storing the processed subhighway data in the storage means, reading the respective subscriber data from the frame relay protocol processing means from the storage means and outputting the read subscriber data to the high-level data link controller.

Preferably, the frame relay protocol processing means includes a frame relay protocol processor for reading the inter-system link protocol-processed subhighway data stored in the storage means, processing the read subhighway data according to the frame relay protocol, outputting the processed subhighway data in the unit of data link connection identifiers, extracting the respective subscriber data from the data transferred over the given E1 trunk channel from the inter working function unit and storing the extracted subscriber data in the storage means in the unit of the subscribers; and a high-level data link controller for formatting the data link connection identifier-unit subhighway data processed by the frame relay protocol processor into a high-level data link control format with a specific number of channels, assigning the formatted subhighway data to the specific E1 trunk channel, transferring them to the inter working function unit over an E1 trunk line, deformatting the data transferred over the given E1 trunk channel from the inter working function unit and outputting the deformatted data to the frame relay protocol processor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
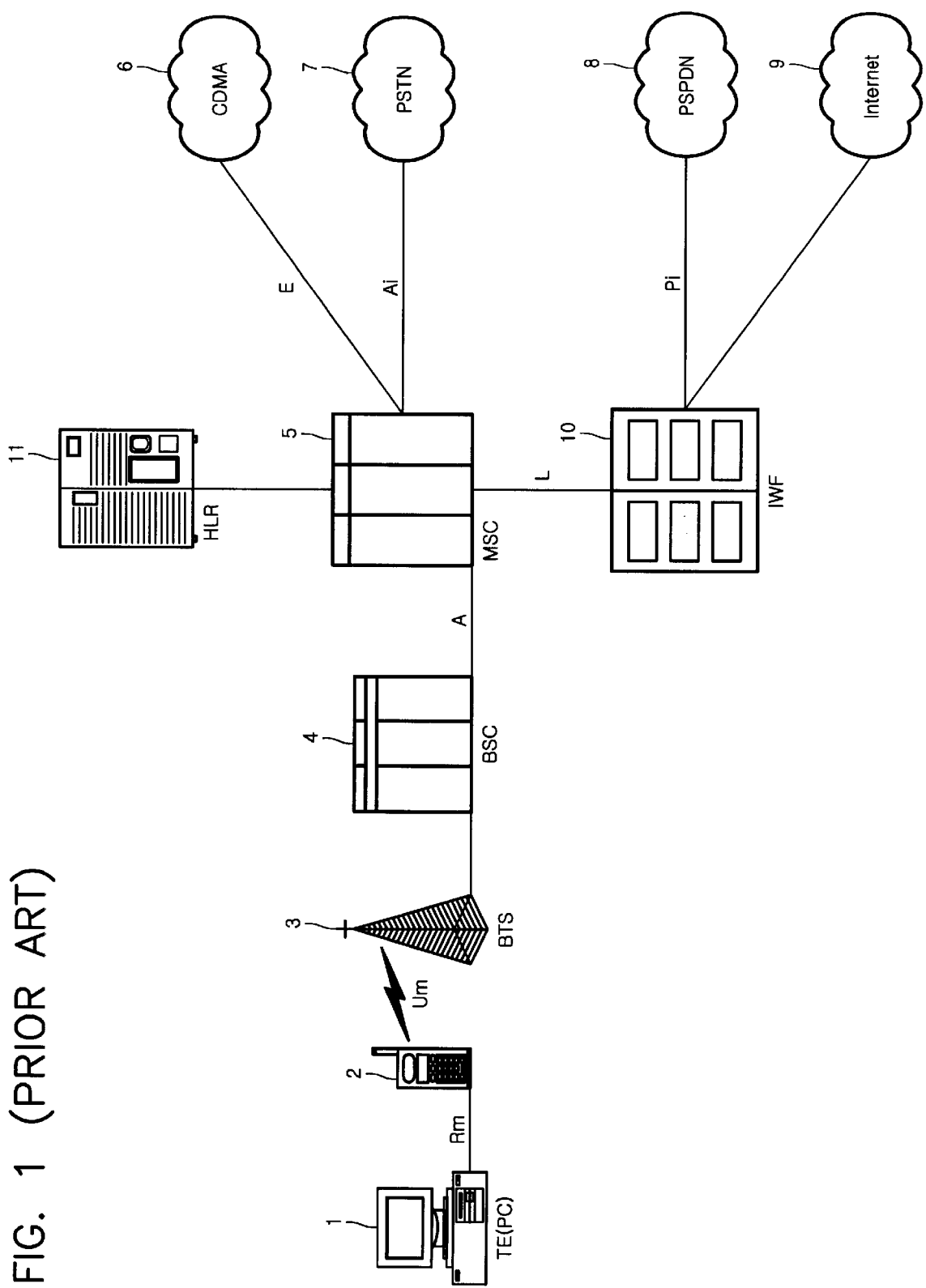
FIG. 1 is a view showing the construction of a radio data service network in a general mobile telecommunications system.

First, a brief description will be given of a method of assigning several low-rate subscriber data (for example, 8 K or 13 K ISLP data) to a high-rate channel (for example, 64 Kbps trunk channel) in accordance with the present invention.

One E1 trunk is typically composed of 32 channels, wherein the channel 0 is used for timing synchronization and the other channels 1–31 are actually used. Because the sixteenth channel is usually used for signaling, the other thirty channels are actually used for traffic. Inter-system link protocol (ISLP) data, delivered from a base station controller (BSC) to a mobile switching center (MSC), is, in turn, transferred to an inter working function unit (IWF) interface rack via a switch in the MSC. At this time, because the ISLP data passed through the MSC switch is transferred directly to the trunk, it will be preferable in operation to use the same channels in subhighways (SHWS) of the switch and the trunk. As a result, it is common that time slots 0 and 16 are not used in each SHW and channels 0 and 16 are not used in the trunk.

Accordingly, for the convenience in operation, time slots 1 of four SHWs SHW0–SHW3 can be assigned to a trunk channel 1 and time slots 2 thereof can be assigned to a trunk channel 2.

Figure 3:
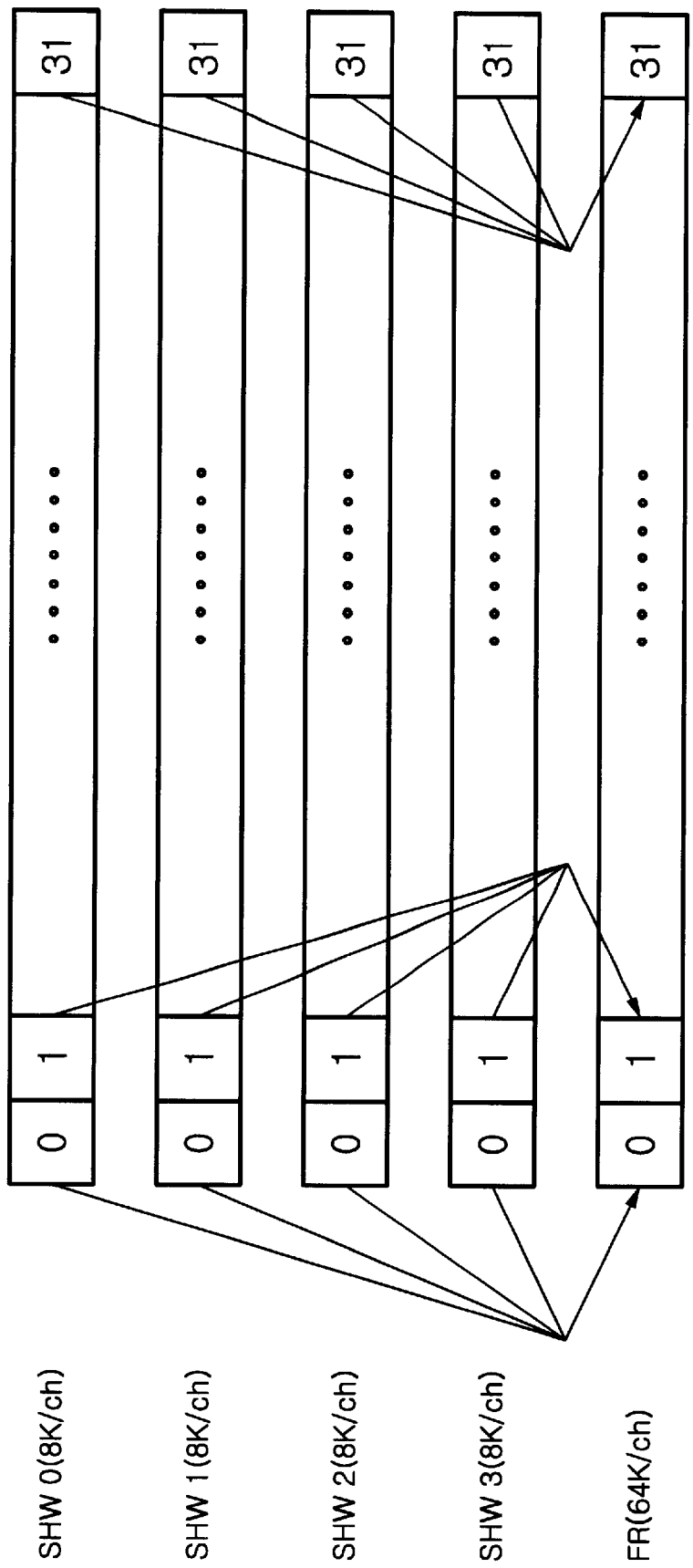
FIG. 3 is a view illustrating an example of a method of assigning four subhighway (SHW) data to one E1 trunk in accordance with the present invention.

Such a method of assigning four SHW data to one E1 trunk is shown in FIG. 3.

Because four subscriber data must be transferred over one trunk channel, they should be transferred in the unit of frames, each of which has to include an identifier of each subscriber. Such an identifier is a data link connection identifier (DLCI). Even though four SHW data are present in the same time slots, they are assigned with different DLCIs and transferred to the trunk, thereby enabling subscriber identification. Of course, the channels 0 and 16 are not used here among the 32 channels of the trunk, as stated previously.

Utilizing the above method, 8 K data of 120 subscribers can be transmitted and received over one E1 trunk. Of course, such data are transferred in the unit of frames. As a result, although one subscriber data is transferred in an instant, several subscriber data seem to be transferred over one channel for a lengthy period of time.

Figure 4:
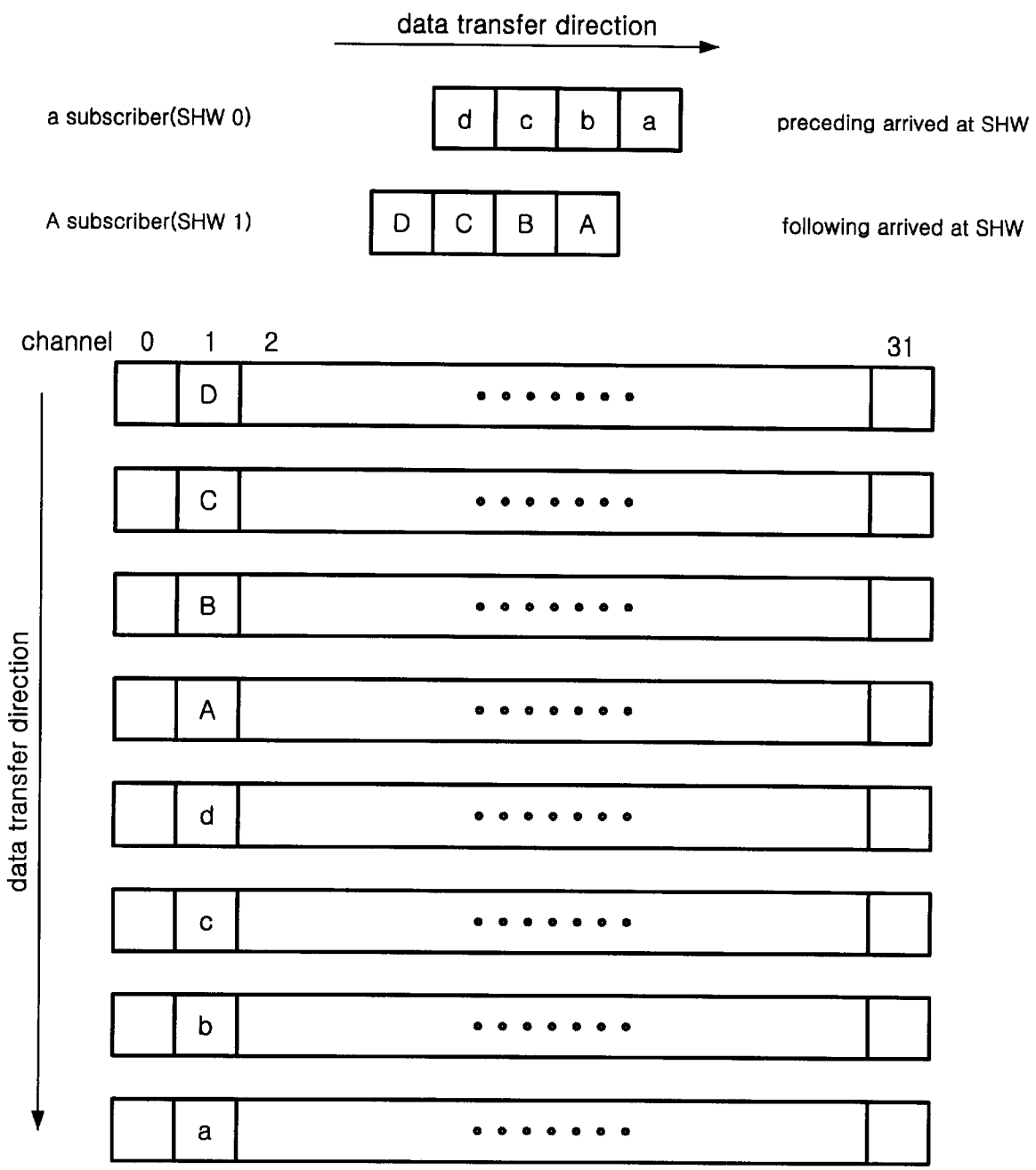
FIG. 4 is a view illustrating an example of a method of transferring two subscriber data to one trunk channel in accordance with the present invention.

FIG. 4 is a view illustrating an example of a method of transferring two subscriber data to one trunk channel in accordance with the present invention.

Data incoming to two SHWs are stacked in a buffer, which is similarly applied to the transfer of four subscriber data. The incoming data are transferred over a trunk channel in order of earlier input frames. In the example of FIG. 4, if subscribers are distinguished from each other in such a way that a subscriber a is assigned with a DLCI of 16 and a subscriber A is assigned with a DLCI of 17, then the IWF connected to the trunk recognizes from the different DLCIs that the received data are originated from different subscribers. In the case where the IWF transfers data with the DLCIs of 16 and 17 to the MSC over a trunk channel 1, then the MSC stores the transferred data respectively in different buffers.

At this time, the data with the DLCI of 16 is transferred over a time slot 1 of the SHW0, and the data with the DLCI of 17 is transferred over a time slot 1 of the SHW1.

Now, a description will be given of a preferred embodiment of an MSC/IWF interfacing apparatus with the above-mentioned technical principle in accordance with the present invention with reference to FIG. 2.

Figure 2:
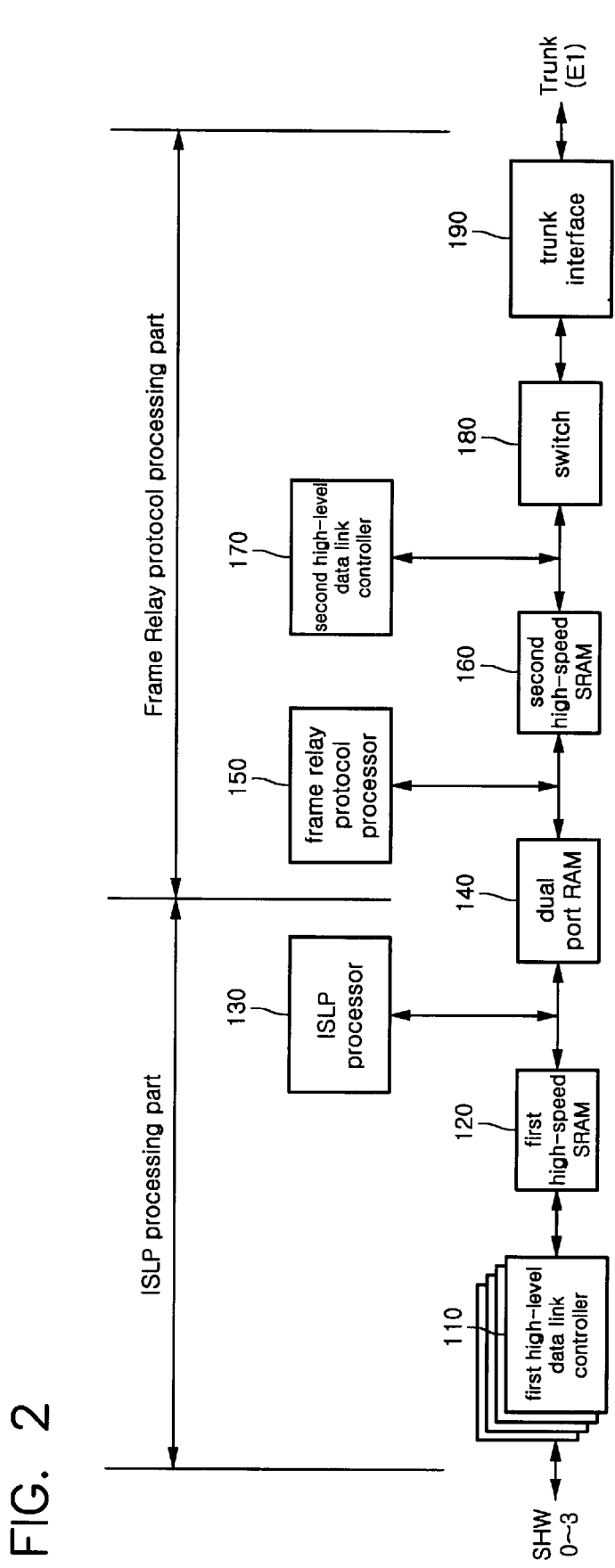
FIG. 2 is a block diagram showing the construction of an apparatus for interfacing between a mobile switching center (MSC) and an inter working function unit (IWF) in accordance with the present invention.

FIG. 2 is a block diagram showing the construction of an apparatus for interfacing between a mobile switching center (MSC) and an inter working function unit (IWF) in accordance with the present invention. As shown in this drawing, the MSC/IWF interfacing apparatus comprises an inter-system link protocol (ISLP) processing part for processing a plurality of subhighway (SHW) data inputted respectively through SHWs in the unit of subscribers according to an ISLP. The ISLP processing part is further adapted to separate data transferred over a given channel of an E1 trunk from the IWF according to the SHWs and their time slots and transfer the separated data respectively to the subscribers. The MSC/IWF interfacing apparatus further comprises a frame replay protocol processing part for extracting only a plurality of actual subscriber data from data of a high level data link control (HDLC) format from the ISLP processing part, processing the extracted actual subscriber data according to a frame relay protocol, assigning the processed actual subscriber data to a specific channel of the E1 trunk and transferring them to the IWF. The frame relay protocol processing part is further adapted to extract respective subscriber data from the data transferred over the given E1 trunk channel from the IWF and output the extracted subscriber data to the ISLP processing part in the unit of the subscribers. The MSC/IWF interfacing apparatus further comprises a dual port random access memory (RAM) 140 connected between the ISLP processing part and frame relay protocol processing part.

The ISLP processing part includes a first high-level data link controller 110 for formatting the plurality of SHW data into the HDLC format, separating the data transferred over the given E1 trunk channel from the IWF according to the SHWs and their time slots and transferring the separated data respectively to the subscribers via the SHWs, and an inter-system link protocol (ISLP) processor 130 for processing the SHW data formatted by the first high-level data link controller 110 according to the ISLP and storing the processed SHW data in the dual port RAM 140. The ISLP processor 130 is further adapted to read the respective subscriber data from the frame relay protocol processing part from the dual port RAM 140 and output the read subscriber data to the first high-level data link controller 110. A first high-speed static random access memory (SRAM) 120 is adapted to store the SHW data formatted by the first high-level data link controller 110 and output the stored SHW data to the ISLP processor 130. The first high-speed SRAM 120 is further adapted to store the subscriber data from the ISLP processor 130 in the unit of the subscribers and output the stored subscriber data to the first high-level data link controller 110.

The frame relay protocol processing part includes a frame relay protocol processor 150 for reading the ISLP-processed SHW data stored in the dual port RAM 140, processing the read SHW data according to the frame relay protocol and outputting the processed SHW data in the unit of data link connection identifiers (DLCIs). The frame relay protocol processor 150 is further adapted to extract the respective subscriber data from the data transferred over the given E1 trunk channel from the IWF and store the extracted subscriber data in the dual port RAM 140 in the unit of the subscribers. The frame relay protocol processing part further includes a second high-level data link controller 170 for formatting the DLCI-unit SHW data processed by the frame relay protocol processor 150 into an HDLC format with a specific number of channels, assigning the formatted SHW data to the specific E1 trunk channel and transferring them to the IWF over an E1 trunk line. The second high-level data link controller 170 is further adapted to deformat the data transferred over the given E1 trunk channel from the IWF and output the deformatted data to the frame relay protocol processor 150.

The frame relay protocol processing part further includes a second high-speed SRAM 160 for storing the SHW data processed by the frame relay protocol processor 150 and the data deformatted by the second high-level data link controller 170, a switch 180 for switching the SHW data formatted by the second high-level data link controller 170 to the IWF or the data transferred over the given E1 trunk channel from the IWF to the second high-level data link controller 170, and a trunk interface 190 for interfacing the SHW data switched by the switch 180 to the IWF over the E1 trunk line or the data transferred over the given E1 trunk channel from the IWF to the switch 180.

Next, a detailed description will be given of the operation of the MSC/IWF interfacing apparatus with the above-mentioned construction in accordance with the present invention.

First, for the transfer of low-rate (for example, 8 Kbps or 13 Kbps) subscriber data from the MSC to the IWF, the first high-level data link controller 110 couples 32 channels of the subscriber data into one channel and processes the coupled 32-channel data on a high-level data link. The processed 32-channel data are stored in the first high-speed SRAM 120 in the unit of subscribers. The ISLP processor 130 processes the subscriber-unit data stored in the first high-speed SRAM 120 according to the ISLP and stores the processed subscriber-unit data in the dual port RAM 140. Then, the frame relay protocol processor 150 reads the subscriber-unit data stored in the dual port RAM 140 and processes them according to the frame relay protocol. The frame relay protocol-processed subscriber data are stored in the second high-speed SRAM 160 in the unit of the subscribers. The second high-level data link controller 170 reads the subscriber-unit data stored in the second high-speed SRAM 160 and processes them to be high-rate 32-channel data, which is delivered to the switch 180. The switch 180 switches the high-rate 32-channel data from the second high-level data link controller 170 to the trunk interface 190. As a result, the trunk interface 190 transfers the high-rate subscriber data switched by the switch 180 to the IWF over the E1 trunk.

On the other hand, high-rate subscriber data transferred from the IWF are interfaced by the trunk interface 190 and delivered to the switch 180. The switch 180 switches the delivered high-rate subscriber data to the second high-level data link controller 170, which processes the switched high-rate subscriber data in the unit of subscribers and stores them in the second high-speed SRAM 160 in the unit of the subscribers. The frame relay protocol processor 150 processes the subscriber-unit data stored in the second high-speed SRAM 160 according to the frame relay protocol and stores them in the dual port RAM 140. The ISLP processor 130 reads the subscriber-unit data stored in the dual port RAM 140 and processes them according to the ISLP. The ISLP-processed subscriber-unit data are stored in the first high-speed SRAM 120 in the unit of the subscribers. Then, the first high-level data link controller 110 reads the subscriber-unit data stored in the first high-speed SRAM 120, separates the read subscriber-unit data according to the SHWs and their time slots and transfers them respectively to the corresponding subscribers.

Although the preferred embodiment of the present invention has been disclosed to assign four time slot data to one trunk channel, the present invention is not limited thereto and the HDLC 32-channel coupling function is performed to utilize several channels like one channel. For example, in the case where subscribers 1–4 are assigned with a channel 1, subscribers 5–8 are assigned with a channel 2 and subscribers 9–12 are assigned with a channel 3, the high-level data link controller in the frame relay protocol processing part can couple the channels 1–3 into one new channel in such a manner that each of the subscribers 1–12 is assigned with one byte in the new channel. In this case, if several subscribers send no data, the other subscribers can transfer a larger amount of data, thereby increasing the channel utilization. Of course, there is present a channel margin even when the twelve subscribers utilize the new channel fully.

As apparent from the above description, according to the present invention, the MSC/IWF interfacing apparatus transfers several low-rate subscriber data to the IWF while mapping them into one trunk channel, thereby enhancing the utilization of the trunk channel.

Further, the number of devices associated with the trunk interface can be reduced, thereby allowing the apparatus to be readily implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for interfacing between a mobile switching center and an inter working function unit, comprising:
   inter-system link protocol processing means for:
   a) processing a plurality of subhighway data inputted respectively through subhighways in the unit of subscribers according to an inter-system link protocol; and
   b) separating data transferred over a given channel of an E1 trunk from said inter working function unit according to said subhighways and their time slots and transferring the separated data respectively to the subscribers;
   storage means for storing the subscriber-unit data processed by said inter-system link protocol processing means in the unit of channels or said data transferred over said given E1 trunk channel from said inter working function unit in the unit of the subscribers; and
   frame relay protocol processing means for:
   a) extracting only a plurality of actual subscriber data from said channel-unit data stored in said storage means, processing the extracted actual subscriber data according to a frame relay protocol, assigning the processed actual subscriber data to a specific channel of said E1 trunk and transferring them to said inter working function unit; and
   b) extracting respective subscriber data from said data transferred over said given E1 trunk channel from said inter working function unit and storing the extracted subscriber data in said storage means in the unit of the subscribers.

2. The apparatus as set forth in claim 1, wherein said inter-system link protocol processing means includes:
   a high-level data link controller for formatting said plurality of subhighway data into a high-level data link control format, separating said data transferred over said given E1 trunk channel from said inter working function unit according to said subhighways and their time slots and transferring the separated data respectively to the subscribers via said subhighways; and
   an inter-system link protocol processor for processing the subhighway data formatted by said high-level data link controller according to said inter-system link protocol, storing the processed subhighway data in said storage means, reading said respective subscriber data from said frame relay protocol processing means from said storage means and outputting the read subscriber data to said high-level data link controller.

3. The apparatus as set forth in claim 2, wherein said inter-system link protocol processing means further includes a memory for storing said subhighway data formatted by said high-level data link controller, outputting the stored subhighway data to said inter-system link protocol processor, storing said subscriber data from said inter-system link protocol processor in the unit of the subscribers and outputting the stored subscriber data to said high-level data link controller.

4. The apparatus as set forth in claim 3, wherein said memory is a high-speed static random access memory.

5. The apparatus as set forth in claim 1, wherein said storage means is a dual port random access memory.

6. The apparatus as set forth in claim 1, wherein said frame relay protocol processing means includes:
   a frame relay protocol processor for reading the inter-system link protocol-processed subhighway data stored in said storage means, processing the read subhighway data according to said frame relay protocol, outputting the processed subhighway data in the unit of data link connection identifiers, extracting said respective subscriber data from said data transferred over said given E1 trunk channel from said inter working function unit and storing the extracted subscriber data in said storage means in the unit of the subscribers; and
   a high-level data link controller for formatting the data link connection identifier-unit subhighway data processed by said frame relay protocol processor into a high-level data link control format with a specific number of channels, assigning the formatted subhighway data to said specific E1 trunk channel, transferring them to said inter working function unit over an E1 trunk line, deformatting said data transferred over said given E1 trunk channel from said inter working function unit and outputting the deformatted data to said frame relay protocol processor.

7. The apparatus as set forth in claim 6, wherein said frame relay protocol processing means further includes:
- a memory for storing said subhighway data processed by said frame relay protocol processor and said data deformatted by said high-level data link controller;
- a switch for switching said subhighway data formatted by said high-level data link controller to said inter working function unit or said data transferred over said given E1 trunk channel from said inter working function unit to said high-level data link controller; and
- a trunk interface for interfacing said subhighway data switched by said switch to said inter working function unit over said E1 trunk line or said data transferred over said given E1 trunk channel from said inter working function unit to said switch.

8. The apparatus as set forth in claim 7, wherein said memory is a high-speed static random access memory.

9. The apparatus as set forth in claim 1 wherein said frame relay protocol processing means is adapted to assign said subhighway data to said specific E1 trunk channel and transfer them to said inter working function unit in the unit of frames over said E1 trunk line.

10. The apparatus as set forth in claim 1, wherein said frame relay protocol processing means is adapted to assign four or five subscriber data of 8 Kbps or 13 Kbps to one channel of an E1 trunk of 64 Kbps to transfer the maximum 120 subscriber data to said inter working function unit.

11. The apparatus as set forth in claim 6 wherein said frame relay protocol processing means is adapted to assign said subhighway data to said specific E1 trunk channel and transfer them to said inter working function unit in the unit of frames over said E1 trunk line.

* * * * *